May 10, 1932.  A. E. WILKOFF ET AL  1,857,704

SPECIAL METAL CHANNEL SECTION

Filed Sept. 10, 1931

INVENTORS.

Arthur E. Wilkoff
Olaf J. Nyberg

THEIR ATTORNEYS.

Patented May 10, 1932

1,857,704

UNITED STATES PATENT OFFICE

ARTHUR E. WILKOFF AND OLAF J. NYBERG, OF NILES, OHIO, ASSIGNORS TO YOUNGSTOWN STEEL CAR COMPANY, A CORPORATION OF OHIO

SPECIAL METAL CHANNEL SECTION

Application filed September 10, 1931. Serial No. 562,185.

The present invention relates to structural shapes of special design, such as special channel shapes and the like adaptable for use where increased strength and minimum weight is required.

More particularly the invention is adapted for use as trackways, and supports for vehicles, such as testing stands, elevators, and the like, where sufficient strength in the trackway is required to carry the load of the vehicle. In the case of certain types of elevators, lifts, etc. for supporting a motor vehicle, it is necessary to remove the tires or wheels of the vehicle, and a relatively low flange on one side of the trackway is required to permit tire or wheel removal. Sufficient rigidity must be provided, however, for the low flange side of the trackway to support the load.

Figure 1:
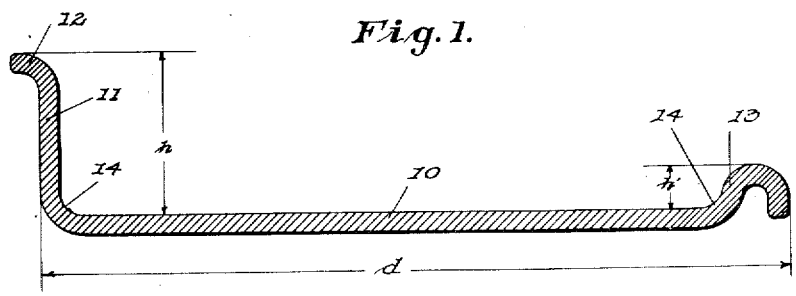
Figure 2:
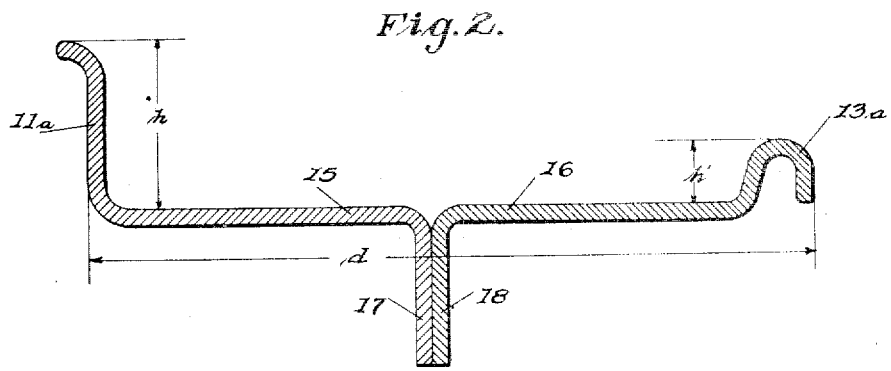

Illustrative of our invention reference may be had to the accompanying drawings wherein Fig. 1 is a sectional view of one shape according to our invention; and Fig. 2 is a sectional view of a modified construction according to our invention.

The section illustrated in the drawings comprises a channel having a relatively wide or deep web 10 of a depth "$d$" and provided at one side with a relatively high or wide flange 11 having a rounded end 12, and at the opposite side with a relatively low or narrow flange or bead 13, the two flanges being connected to the web by fillets 14 of substantial radius, i. e. ½ inch radius, in the case of 15 inch channels.

In the preferred embodiment the width or height ($h$) of the flange 13 is considerably less than the width or height ($h$) of the flange 11, and preferably is less than ½ the height ($h$) of flange 11, so as to permit easy and ready removal of the tires or wheels from the vehicle supported on the section.

In order to give sufficient strength and rigidity to the low flange side of the section, sufficient metal is provided in the flange 13, preferably in excess of one half of the metal in the flange 11, and/or nearly equal to the metal of the flange 11, and the flange 13 is reversely bent, preferably in an inverted U or V-shape, to keep its height to a minimum and to the required dimensions. Thus by shaping the flange 13 substantially in the manner shown, we effect a strengthening of the flange 13 in comparison to the effective height.

According to Fig. 1, the invention is embodied in its simplest form by fabricating the special channel from a single piece of metal.

Another embodiment of the invention is shown in Fig. 2 wherein the channel is built up of a pair of sections 15 and 16, the section 15 being formed at one edge with the deep flange 11ª and the section 16 being formed at one end with the reversely shaped flange or bead 13ª, the sections 15 and 16 being further formed at their adjacent edges with flanges 17 and 18 extending oppositely to their respective flanges 11ª and 13ª. The flanges 17 and 18 of the sections 15 and 16 respectively, may be of any suitable depth as required for any particular purpose, and may be bolted, riveted or welded together to secure the two sections rigidly together. The reinforcing flanges 17 and 18 greatly increase the strength of the section and avoid the necessity of securing separate reinforcing members to the underside of the section when excessive loads are apt to be imposed on the bar.

Our improved section may be fabricated in any convenient way for example, as by rolling, but preferably is pressed between dies. Advantageously the section is of uniform thickness throughout, although it will be apparent that it may be of varying cross section without departing from the spirit of our invention.

Our improved sections are highly suited for use in place, or as substitutes for standard channel sections of corresponding depth, while effecting a considerable saving in weight of from twenty to twenty-five per cent.

When used as wheel runways or supports for motor vehicles, the section is particularly useful, because of the low flange, which permits wheel or tire removal and which, owing to its inverted U-shaped construction, has sufficient strength and stiffness adequate to support all reasonable loads.

I claim:

1. A channel section having a deep web and side flanges, one of the flanges being of substantial width and substantially perpendicular to the web and the opposite flange being of inverted U-shape.

2. A channel bar having a relatively deep web and opposed flanges of unequal widths, the wider flange extending substantially normal to the plane of said web and the narrower flange being reversely bent, affording a substantial rigidity to the adjacent side of the bar with a minimum of flange width.

3. A channel bar of substantially uniform thickness throughout having a relatively deep web and opposed flanges, one of said flanges being reversely bent in substantially inverted U-shaped form and extending beyond the adjacent face of the web a distance substantially less than one half the length of the flange.

4. A channel bar of substantially uniform thickness throughout having a central web and opposed flanges, at least one of said flanges being reversely bent to confine the flange width as measured from the adjacent web face, to less than one half the length of the other flange.

5. A special metal channel unit comprising opposed sections, each formed with a depending flange, adapted to be secured together, one of said sections having an outer marginal flange of substantial depth, and the other section having an outer marginal edge formed as a reversely bent flange of substantially less than one half the height of the opposite marginal flange.

6. A special metal channel unit according to claim 5 wherein the united depending flanges form a longitudinal reinforcement for the web portion of the unit.

In testimony whereof, we have signed our names to this specification.

ARTHUR E. WILKOFF.
OLAF J. NYBERG.

DISCLAIMER 1,857,704.—*Arthur E. Wilkoff* and *Olaf J. Nyberg*, Niles, Ohio. SPECIAL METAL CHANNEL SECTION. Patent dated May 10, 1932. Disclaimer filed November 2, 1932, by the assignee, *Youngstown Steel Car Corporation*.

Hereby disclaims the subject matter of claims 1, 2, 3, and 4 of said patent excepting when the special metal channel section claimed is of a one-piece construction and a portion of the wider flange above the plane of the web is bent outwardly to reinforce and stiffen said flange.

[*Official Gazette November 22, 1932.*]

sufficient strength and stiffness adequate to support all reasonable loads.

I claim:

1. A channel section having a deep web and side flanges, one of the flanges being of substantial width and substantially perpendicular to the web and the opposite flange being of inverted U-shape.

2. A channel bar having a relatively deep web and opposed flanges of unequal widths, the wider flange extending substantially normal to the plane of said web and the narrower flange being reversely bent, affording a substantial rigidity to the adjacent side of the bar with a minimum of flange width.

3. A channel bar of substantially uniform thickness throughout having a relatively deep web and opposed flanges, one of said flanges being reversely bent in substantially inverted U-shaped form and extending beyond the adjacent face of the web a distance substantially less than one half the length of the flange.

4. A channel bar of substantially uniform thickness throughout having a central web and opposed flanges, at least one of said flanges being reversely bent to confine the flange width as measured from the adjacent web face, to less than one half the length of the other flange.

5. A special metal channel unit comprising opposed sections, each formed with a depending flange, adapted to be secured together, one of said sections having an outer marginal flange of substantial depth, and the other section having an outer marginal edge formed as a reversely bent flange of substantially less than one half the height of the opposite marginal flange.

6. A special metal channel unit according to claim 5 wherein the united depending flanges form a longitudinal reinforcement for the web portion of the unit.

In testimony whereof, we have signed our names to this specification.

ARTHUR E. WILKOFF.
OLAF J. NYBERG.

DISCLAIMER 1,857,704.—*Arthur E. Wilkoff* and *Olaf J. Nyberg*, Niles, Ohio. SPECIAL METAL CHANNEL SECTION. Patent dated May 10, 1932. Disclaimer filed November 2, 1932, by the assignee, *Youngstown Steel Car Corporation*.

Hereby disclaims the subject matter of claims 1, 2, 3, and 4 of said patent excepting when the special metal channel section claimed is of a one-piece construction and a portion of the wider flange above the plane of the web is bent outwardly to reinforce and stiffen said flange.

[*Official Gazette November 22, 1932.*]

DISCLAIMER 1,857,704.—*Arthur E. Wilkoff* and *Olaf J. Nyberg*, Niles, Ohio. SPECIAL METAL CHANNEL SECTION. Patent dated May 10, 1932. Disclaimer filed November 2, 1932, by the assignee, *Youngstown Steel Car Corporation*.

Hereby disclaims the subject matter of claims 1, 2, 3, and 4 of said patent excepting when the special metal channel section claimed is of a one-piece construction and a portion of the wider flange above the plane of the web is bent outwardly to reinforce and stiffen said flange.

[*Official Gazette November 22, 1932.*]